(12) United States Patent
Yamamoto et al.

(10) Patent No.: US 8,895,884 B2
(45) Date of Patent: Nov. 25, 2014

(54) TANK TYPE VACUUM CIRCUIT BREAKER

(75) Inventors: Yohei Yamamoto, Tokyo (JP);
Masahiro Arioka, Tokyo (JP)

(73) Assignee: Mitsubishi Electric Corporation,
Chiyoda-Ku, Tokyo (JP)

(*) Notice: Subject to any disclaimer, the term of this patent is extended or adjusted under 35 U.S.C. 154(b) by 371 days.

(21) Appl. No.: 13/390,575

(22) PCT Filed: Oct. 28, 2010

(86) PCT No.: PCT/JP2010/006365
§ 371 (c)(1),
(2), (4) Date: Feb. 15, 2012

(87) PCT Pub. No.: WO2011/052206
PCT Pub. Date: May 5, 2011

(65) Prior Publication Data
US 2012/0138574 A1    Jun. 7, 2012

(30) Foreign Application Priority Data

Oct. 29, 2009  (JP) .................................. 2009-248868

(51) Int. Cl.
| | | |
|---|---|---|
| *H01H 33/42* | (2006.01) | |
| *H01H 33/666* | (2006.01) | |
| *H02B 13/035* | (2006.01) | |
| *H01H 33/28* | (2006.01) | |

(52) U.S. Cl.
CPC ........... *H01H 33/666* (2013.01); *H01H 33/285* (2013.01); *H01H 33/42* (2013.01); *H01H 2033/426* (2013.01); *H02B 13/0354* (2013.01)
USPC ................................. 218/140; 218/7; 218/14

(58) Field of Classification Search
CPC . H01H 33/66; H01H 33/666; H01H 33/6606; H01H 33/02; H01H 33/38
USPC .......................... 218/7, 10, 14, 140, 153, 154
See application file for complete search history.

(56) References Cited

U.S. PATENT DOCUMENTS

| | | | |
|---|---|---|---|
| 4,343,030 A | * | 8/1982 | Date et al. ...................... 200/400 |
| 4,449,021 A | | 5/1984 | Wakayama et al. |

(Continued)

FOREIGN PATENT DOCUMENTS

| | | |
|---|---|---|
| CN | 1405807 A | 3/2003 |
| JP | 58-30226 U | 2/1983 |

(Continued)

OTHER PUBLICATIONS

Office Action issued Aug. 7, 2013, by Korean Patent Office in Corresponding Korean Patent Application No. 10-2012-7010398 and English translation of the Office Action (5 pages).

(Continued)

*Primary Examiner* — Amy Cohen Johnson
*Assistant Examiner* — Marina Fishman
(74) *Attorney, Agent, or Firm* — Buchanan Ingersoll & Rooney PC

(57) ABSTRACT

A tank type vacuum circuit breaker uses a columnar or cylindrical insulation rod at a connection portion between an operating mechanism unit and a vacuum valve. The insulation rod is connected to the operating mechanism unit and the vacuum valve by rod-shaped pins. To prevent the insulation rod itself from falling, connection is made by shifting phases of the pins 90 degrees, respectively, each pin being connected to the operating mechanism unit and the vacuum valve. Accordingly, the falling of the insulation rod, the use of an insulation support tube and an insulation support for ensuring mechanical strength, are avoided. Further fastening of those supports by bolts or the like is not needed. Increases in the number of components, the size of the shape of assembly members around the insulation rod, and weight due to such increases, are prevented.

2 Claims, 3 Drawing Sheets

(56) References Cited

U.S. PATENT DOCUMENTS

| | | |
|---|---|---|
| 6,521,839 B1 | 2/2003 | Komatsu et al. |
| 2010/0288733 A1 | 11/2010 | Ichikawa et al. |

FOREIGN PATENT DOCUMENTS

| | | |
|---|---|---|
| JP | 7-37470 A | 2/1995 |
| JP | 2004-281302 A | 10/2004 |
| JP | 2005-78971 A | 3/2005 |
| JP | 2005-078971 A | 3/2005 |
| JP | 2007-306701 A | 11/2007 |
| KR | 860000223 B1 | 3/1986 |

OTHER PUBLICATIONS

Office Action dated Apr. 11, 2013, issued in corresponding Korean Patent Application No. 10-2012-7010398, and an English Translation of the Office Action. (7 pages).

Chinese Office Action dated Feb. 26, 2014, issued in corresponding Chinese Patent Application No. 201080049743.8 with an English translation thereof. (9 pgs).

\* cited by examiner

TANK TYPE VACUUM CIRCUIT BREAKER

TECHNICAL FIELD

The present invention relates to switchgear for use in electric power transmission and distribution facilities, reception and distribution facilities, and the like.

DESCRIPTION OF THE RELATED ART

High pressure dry air is sealed in a ground tank. A movable side contact case is supported at one end of the ground tank via an insulation support tube and an insulation support; a fixed side contact case is supported at the other end in the ground tank via a support insulator; and a vacuum interrupter is supported between the contact cases.

RELATED ART DOCUMENT

Patent Document

Patent Document 1: Japanese Unexamined Patent Publication No. 2007-306701 (FIG. 2)

DISCLOSURE OF THE INVENTION

Problems to be Solved by the Invention

In switchgear, an insulation rod is used as a connection portion between an operating mechanism unit and a vacuum valve. The insulation rod has a role which bridges the operating mechanism unit and the vacuum valve, and the insulation rod is a connection member necessary for closing or opening a contact in the inside of the vacuum valve in accordance with an opening or closing command given by the operating mechanism unit. As disclosed in the related art (see the related art document), in order to suppress the insulation rod from falling or in order to ensure mechanical strength, an insulation support tube and an insulation support are used, and those members are further fastened by bolts or the like. In this case, the number of components increases, the shape of an assembly member around the insulation rod also becomes large, the weight also further increases, and workability becomes bad.

Means for Solving the Problems

An insulation rod in the present invention has a hole at each end section thereof; at sections where the insulation rod is connected to an operating mechanism unit and a vacuum valve, a connection component for the operating mechanism unit and a connection component for the vacuum valve are each formed with a hole, the connection components being connected to the insulation rod; connection can be made by a rod pin with respect to each hole of the insulation rod and the connection components; the rod pins are used to connect the operating mechanism unit and the vacuum valve; the rod pins are arranged in a state where phases are different 90 degrees on the connection side to the operating mechanism unit and on the connection side to the vacuum valve; and a clearance is provided between each hole of the insulation rod and the rod pin to be inserted therein. Furthermore, fiber reinforced plastic (FRP) resin is used as a material of the insulation rod to satisfy mechanical strength and to also achieve reduction in weight; and as a result, reduction in weight of switchgear itself including these portions is achieved.

Advantageous Effect of the Invention

The present invention is characterized by a structure described in the means for solving the problems; whereby, the insulation rod portion is easily configured and has mechanical strength, and reduction in weight of the whole rod portion can be achieved. Further, the insulation rod is suppressed from falling by a method of connecting pin sections of the insulation rod, the method being the present invention.

MODE FOR CARRYING OUT THE INVENTION

Embodiment 1

Figure 1:
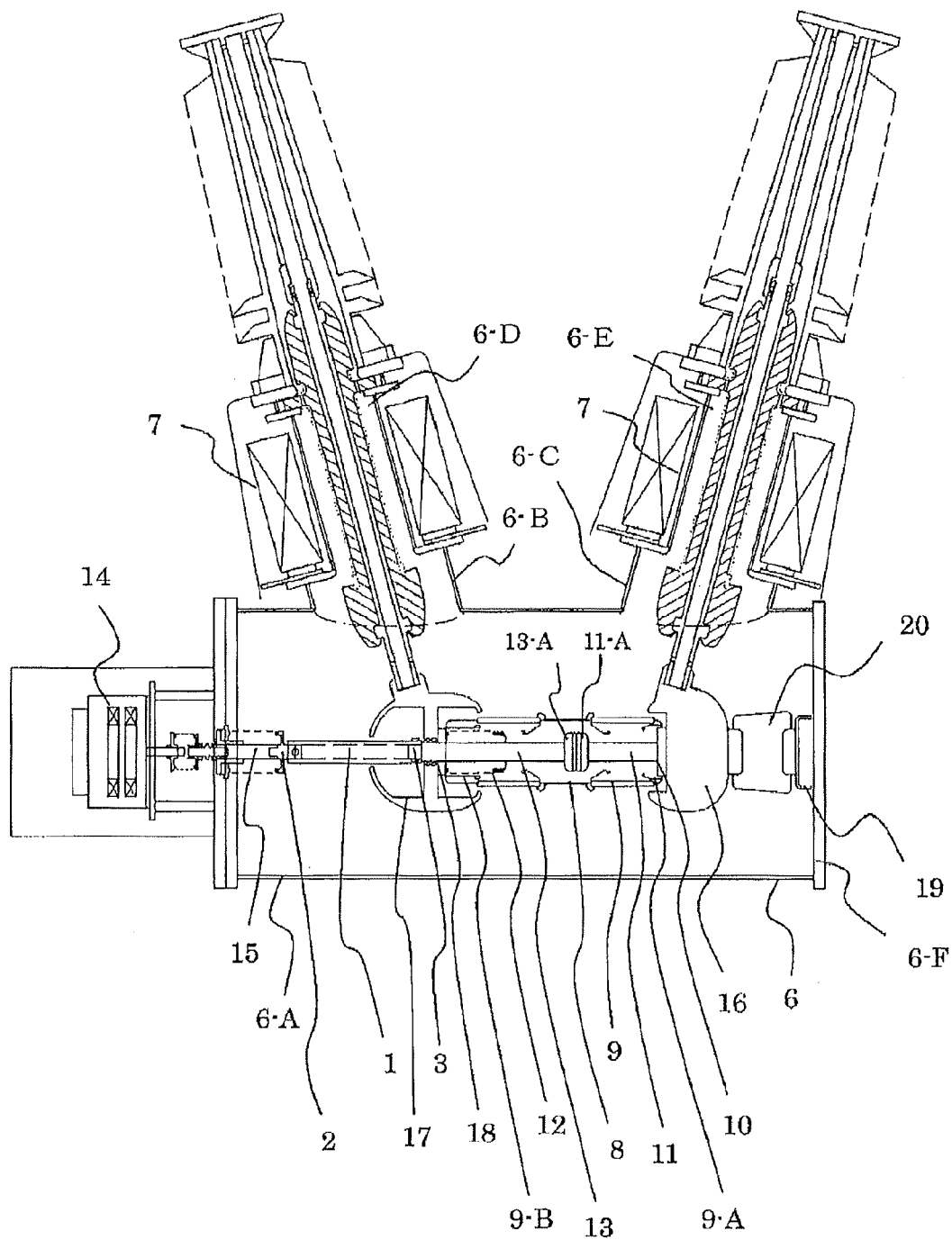
FIG. 1 is a sectional view of switchgear of the present embodiment.

FIG. 1 shows a tank type vacuum circuit breaker in a mode for carrying out the present invention.

An electrically grounded pressure tank 6 is installed with a torso portion 6-A being kept horizontal; and a pair of opening portions 6-B, 6-C are provided on the upper side of the pressure tank 6. Current transformer mounting portions 6-D, 6-E coaxial with the opening portions and smaller in diameter than the opening portions, and flanges for connecting those portions are constituted. A current transformer for measuring current 7 is mounted outside the current transformer mounting portion.

A vacuum valve 8 is placed in the pressure tank 6 via an air gap formed with respect to the torso portion 6-A. The vacuum valve 8 is composed of a tubular vacuum vessel 9 made of insulating material such as ceramics; a fixed conductor 11 which is placed in the vacuum vessel 9, one end of the fixed conductor 11 being joined to an end plate 10 which is for airtight sealing a fixed side end section 9-A of the vacuum vessel 9; and a movable conductor 13 which is disposed to be capable of being connected/disconnected to/from the fixed conductor 11, the other end of the movable conductor 13 being extended outside the vacuum vessel 9 via a bellows 12 attached to a movable side end section 9-B of the vacuum vessel 9. A fixed contact 11-A and a movable contact 13-A are formed at a portion where the fixed conductor 11 comes into contact with the movable conductor 13, respectively. The end plate 10, the fixed conductor 11, and the movable conductor 13 are made of conductive material such as copper alloy and aluminum alloy; and the inside of the vacuum valve 8 is airtight held under vacuum.

Opening and closing means 14 by which the fixed contact 11-A and the movable contact 13-A are connected/disconnected to be closed/opened is provided outside the pressure tank 6.

The opening and closing means 14 is made to move the movable conductor 13 in a horizontal direction via an operating rod 15 and an insulation rod 1; and accordingly, the fixed contact 11-A and the movable contact 13-A are connected/disconnected to be closed/opened. At this time, the bellows 12 follows the movement of the movable conductor 13; and therefore, the inside of the vacuum valve 8 is held under vacuum. Incidentally, the insulation rod 1 is connected while securing an insulation distance in which the movable conductor 13 can be electrically insulated from the operating rod 15.

A fixed side shield 16 and a movable side shield 17 are provided on both sides of the vacuum valve 8. The fixed side shield 16 is disposed so as to cover the fixed side end section 9-A of the vacuum valve 8, and is connected to the end plate 10 on the fixed side. The movable side shield 17 is disposed so as to cover the movable side end section 9-B of the vacuum valve 8 and an end section of the movable conductor 13, and is connected to an end plate 18 on the movable side of the vacuum valve 8. Furthermore, the vacuum valve 8 is supported by a support frame 19 attached in the vicinity of a flange 6-F of the pressure tank 6, an insulation support member 20, and the fixed side shield 16.

Figure 4:
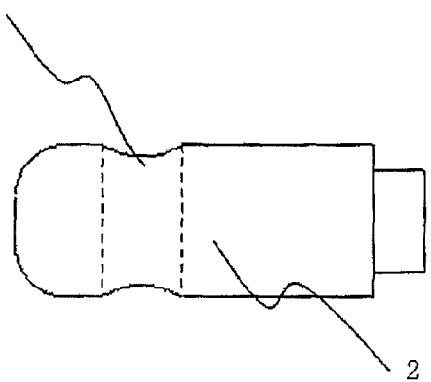
FIG. 4 is a front view of a connection component for an operating mechanism unit of the present embodiment.
Figure 5:
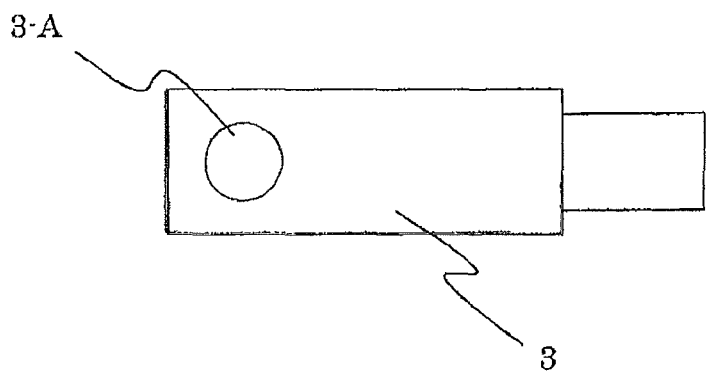
FIG. 5 is a front view of a connection component for a vacuum valve of the present embodiment.

The shape of the insulation rod is a cylindrical shape having a hole 1-A in a center portion thereof and through holes 1-B, 1-C each formed at end sections thereof. The insulation rod 1 is a connection portion between the operating mechanism unit and the vacuum valve, and the connection component for the operating mechanism unit 2 to be connected to the insulation rod 1 is shown in FIG. 4. The connection component for the operating mechanism unit 2 is formed with a hole 2-A shown in FIG. 4. Similarly, a connection component for the vacuum valve 3 to be connected to the insulation rod 1 is shown in FIG. 5. The connection component for the vacuum valve 3 is also formed with a hole 3-A shown in FIG. 5.

The connection component for the operating mechanism unit 2 and the connection component for the vacuum valve 3 are produced by being cut from round material, and each connection component 2 or 3 can be inserted to the hole 1-A of the center portion of the insulation rod.

Figure 6:
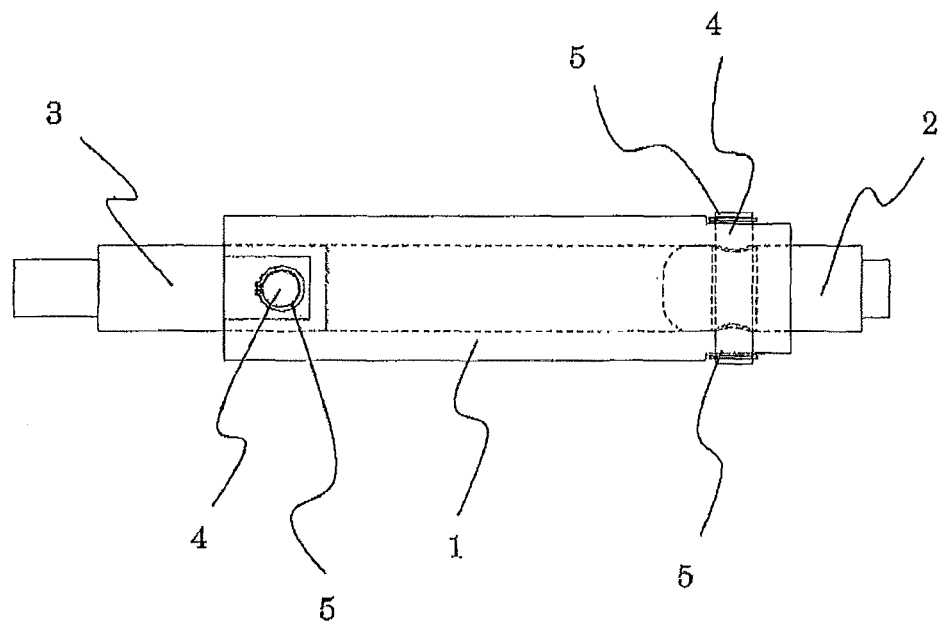
FIG. 6 is a front view of the insulation rod after connection of the present embodiment.

In the case of connection, the connection component for the operating mechanism unit 2 and the connection component for the vacuum valve 3 are inserted to the hole 1-A of the insulation rod 1 to connect. At this time, the position of the hole 2-A of a connection section for the operating mechanism unit and the position of the hole 3-A of a connection section for the vacuum valve are arranged so as to coincide with the holes 1-B, 1-C of the end sections of the insulation rod 1. A rod pin 4 is disposed at each hole 1-B, 1-C (2-A, 3-A); and accordingly, the operating mechanism unit and the vacuum valve are connected to the insulation rod 1 (see FIG. 6).

Figure 2:
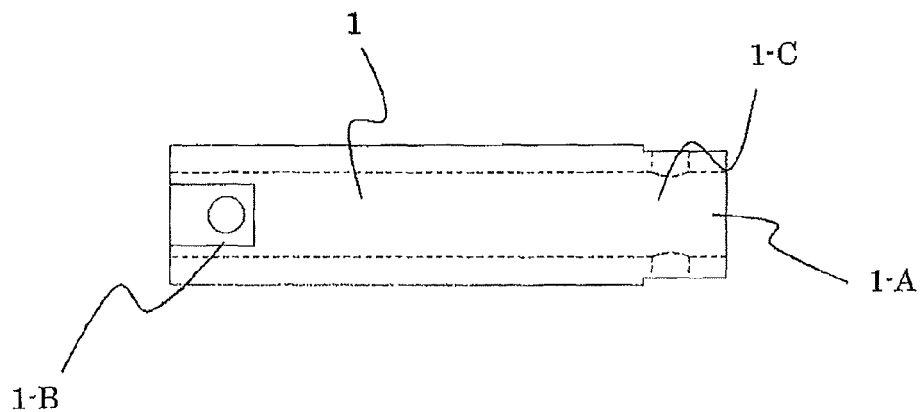
FIG. 2 is a front view of an insulation rod of the present embodiment.

At this time, it is characterized in that, the through holes 1-B, 1-C formed at the end sections of the insulation rod 1 are shifted 90 degrees in phase as shown in FIG. 2. Therefore, the rod pins 4 to be inevitably used for the connection are also arranged in a state where the phases are different 90 degrees on the connection side to the operating mechanism unit and on the connection side to the vacuum valve. If, in the case where the phases of the rod pins 4 to be connected are not shifted 90 degrees, that is, in the case where the rod pins 4 are arranged in parallel, it is assumed that the insulation rod 1 is fallen by a clearance between the rod pin 4 and the hole 1-B or 1-C to a direction being rotated using the rod pin 4 as an axis. However, the phases of the rod pins 4 are shifted 90 degrees as shown in the embodiment; and accordingly, even if the rod pin 4 disposed on one side is tried to be rotated using the rod pin 4 as an axis, the other rod pin 4 is disposed perpendicularly to the rod pin 4 disposed on one side and therefore the movement is regulated. As a result, the insulation rod 1 can be suppressed from falling. Furthermore, the configuration is such that, for example, a C ring 5 can be used as a retainer of the rod pin 4 and thus assembly can be easily performed.

Embodiment 2

Figure 3:
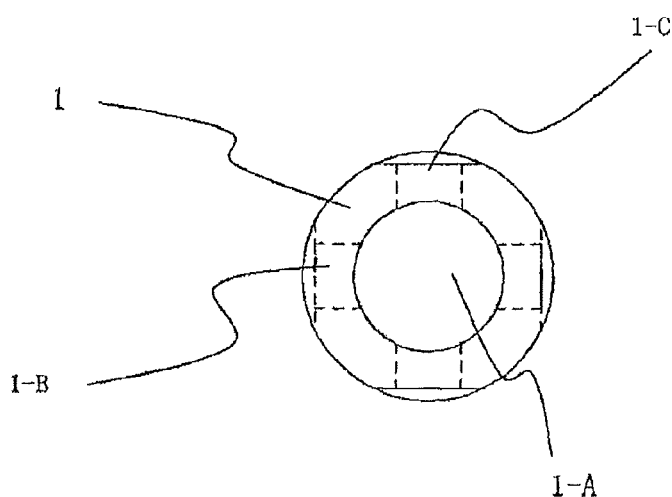
FIG. 3 is a side view of the insulation rod of the present embodiment.

FIG. 2 shows a front view of an insulation rod 1 and FIG. 3 shows a side view of the insulation rod 1. Fiber reinforced plastic (FRP) is used for the insulation rod 1 as a material; and the shape of the insulation rod is a cylindrical shape and therefore reduction in weight can be achieved. Furthermore, connection is made by shifting phases of rod pins 4 disposed as described in Embodiment 1; and accordingly, the insulation rod 1 can be suppressed from falling. Therefore, a different component for supporting the insulation rod 1 (corresponding to the support or the like for supporting the insulation rod described in the related art) is not needed. With this, fastening members such as a bolt for attaching the different component are not also needed; and therefore, the number of components as a whole can be reduced, reduction in weight is achieved, working hours of an assembly worker can also be reduced, and cost can also be suppressed.

DESCRIPTION OF REFERENCE NUMERALS

1 Insulation rod
1-A Hole of center of insulation rod
1-B Hole of end section of insulation rod
1-C Hole of end section of insulation rod
2 Connection component for operating mechanism unit
2-A Hole of connection component for operating mechanism unit
3 Connection component for vacuum valve
3-A Hole of connection component for vacuum valve
4 Rod pin
5 C ring
6 Pressure tank
6-A Torso portion
6-B Opening portion
6-C Opening portion
6-D Current transformer mounting portion
6-E Current transformer mounting portion
6-F Flange
7 Current transformer
8 Vacuum valve
9 Vacuum vessel
9-A Fixed side end section
9-B Movable side end section
10 End plate
11 Fixed conductor
11-A Fixed contact
12 Bellows
13 Movable conductor
13-A Movable contact
14 Opening and closing means
15 Operating rod
16 Fixed side shield
17 Movable side shield
18 End plate
19 Support frame
20 Insulation support member

The invention claimed is:
1. A tank type vacuum circuit breaker,
wherein an insulation rod of a cylindrical shape has a hole at each end section thereof;
at sections where said insulation rod is connected to an operating mechanism unit and a vacuum valve, a connection component for said operating mechanism unit and a connection component for said vacuum valve are each formed with a hole, said connection components being connected to said insulation rod with at least the connection component for said vacuum valve inserted inside insulation rod;

the connections are made by a rod pin with respect to each hole of said insulation rod and said connection components;

said rod pins are used to connect said operating mechanism unit and said vacuum valve;

said rod pins each having an axis and arranged such that a rod pin on the connection side to said operating mechanism unit is offset along the circumference of the insulation rod from the axis of another rod pin on the connection side to said vacuum valve by an angle of 90 degrees; and a clearance is provided between each hole of said insulation rod and said pin to be inserted thereto.

2. The tank type vacuum circuit breaker according to claim 1, further including at least one C-ring that retains a respective one of the rod pins in the insulation rod.

* * * * *